Patented Dec. 24, 1946

2,413,253

UNITED STATES PATENT OFFICE 2,413,253

PURIFICATION OF INDENE

Frank J. Soday, Baton Rouge, La., assignor to The United Gas Improvement Company, a corporation of Pennsylvania No Drawing. Application February 9, 1944, Serial No. 521,716

7 Claims. (Cl. 260—674)

This invention pertains generally to the purification of indene and pertains particularly to the purification of indene obtained from light oil.

More specifically, this invention pertains to the purification of light oil indene fractions by the application of metals in group IA and group IIA of the periodic table, or alloys thereof.

The light oil obtained upon the pyrolysis of petroleum or of petroleum hydrocarbons, suitably in the gaseous phase at elevated temperatures, is an especially desirable source of indene. Such light oil indene fractions may be readily converted to resins by catalytic polymerization, such as by the use of a surface active agent, such as clay; by the use of a mineral acid-organic solvent mixture and/or reaction product, such as sulfuric acid mixtures with alcohols, ethers, or esters; or by other suitable catalysts.

I have discovered that indene, and particularly light oil indene fractions, contain numerous impurities which impart color to resins prepared therefrom, as well as other undesirable characteristics.

While I have not as yet determined exactly the character of all of these impurities, they usually include sulfur compounds, such as mercaptans and disulfides; nitrogen-containing compounds, such as amines; acetylenic compounds; oxygen-containing compounds, such as organic peroxides, oxides, peracids, and aldehydes; and the like.

I have discovered that the major portion, if not all, of these undesired impurities may be removed from indene, and particularly from light oil indene fractions, by treatment with one or more metals in groups IA and IIA of the periodic table, preferably in finely divided form or in the form of solutions or dispersions in suitable solvents or vehicles, or in the form of alloys thereof.

These results are entirely unexpected, as the metals in these groups, which include lithium, sodium, potassium, rubidium, caesium, barium, strontium, and calcium, are known to either react with indene or to be catalysts for its polymerization.

Alloys of these metals also may be used, such as $NaPb_{10}$, $NaHg_4$, $NaCa_5$, $NaZn_{12}$, $KNa$, and the like.

Calcium, potassium, and/or sodium are particularly desirable.

Due to its ready availability, low cost, and active character, I prefer to employ sodium.

While these refining agents may be used in any desired form, I prefer to employ them in the form of a finely divided suspension, emulsion, or solution.

Thus, for example, metallic sodium may be (1) dispersed in hot xylene, paraffin, or other inert organic material with vigorous agitation, (2) sprayed through suitable orifices or nozzles, (3) extruded through very fine orifices, (4) dissolved in a solvent such as liquid ammonia, and the like.

The treatment may be carried out at any desired temperature, such as temperatures in the range of 30 to 200° C.

In order to prevent undue loss of indene, I prefer to employ less than 5%, and more preferably less than 3%, of the refining agent, based on the amount of indene present.

The process preferably is carried out by adding the refining agent, to the indene or indene fraction, followed by agitating and/or refluxing the mixture for the desired period of time, followed by the removal of the refining agent and reaction product, such as by decantation, filtration, or preferably, by distillation.

The indene, indene fractions, employed in my invention may be obtained from any desired source. I prefer, however, to employ indene or indene fractions resulting from the distillation and/or concentration of light oil obtained from carburetted water gas and/or oil gas. Light oil indene fractions obtained by condensation of the liquid products formed during the production of combustible gas by processes involving the pyrolytic decomposition of petroleum oil with or without the aid of catalysts at set temperatures above 1200° F., and more particularly above 1350° F., are especially preferred.

Indene fractions containing any desired concentration of indene may be employed, although I generally prefer to employ fractions boiling mainly in the range of 175 to 190° C. and containing not less than 20% indene.

In the specification and the claims, the terms "refined indene" and/or "refined indene fraction" are intended to designate indene or indene fractions which have been treated by any of the foregoing methods, or any combination thereof, or otherwise.

The refined indene or indene fraction is ideally suited for the preparation of resins, such as those of the oil-soluble type.

In the case of fairly high concentrated indene fractions, the reaction preferably is carried out in the presence of a solvent, such as a hydrocarbon solvent, in order to moderate the intensity of the reaction and to reduce the viscosity of the resulting resin solution, thus facilitating the subsequent filtration, and other, steps.

Examples of catalysts which may be employed for the polymerization of indene are mineral acids such as sulfuric and phosphoric acids; alkyl and aryl acid sulfates; mixtures of sulfuric acid and certain organic compounds, particularly ethers, alcohols, and esters, whether such mixtures are heated or otherwise reacted, or mixed at room temperatures; and surface active materials. Reference is made to my copending application serial No. 290,503, filed August 16, 1939, which has matured into Patent 2,373,714, granted April 17, 1945.

The use of surface active materials is preferred. Examples of surface active materials which may be used for the production of resins of the type described herein are certain natural clays or earths, such as, for example, attapulgus clay, Tonsil, Halclay, Floridin, bleaching earths, kaolins, adsorbent earths, and the like; finely divided silica or hydrosilicates, such as, for example, silica gel; diatomaceous earths, such as, for example, fuller's earth, celite, and the like; finely divided carbon or charcoal; finely divided alumina; and finely divided metals, such as, for example, aluminum or zinc powder. Reference is made to my copending application Serial No. 450,907, filed July 14, 1942.

In general, it may be said that these materials depend largely for their catalytic activity upon the extremely large surface area exposed per unit weight. Their activity, therefor, is largely directly proportional to their degree of fineness or dispersion. Surface active agents in which at least the preponderate part of the material comprises particles which will pass through a 50 mesh screen, and more particularly a 100 mesh screen, are preferred. Excellent results are obtained when surface active agents in which at least the preponderate part will pass through a 200 mesh screen are employed.

In addition, these materials may be further activated, thus enhancing their polymerizing activity, if desired, by suitable treatment prior to their use as polymerizing agents. Thus, for example, the natural clays or earths may be treated with an acid or acidic substance, such as sulfuric acid, and/or the application of heat.

After treatment with an acid or acidic substance, the treated material preferably is washed to remove excess acid, and dried at elevated temperatures. Other procedures obviously may be employed to render the clay or other absorbent material neutral prior to the use thereof.

In this connection, it is well to point out that the use of surface active agents of the type described, for the polymerization of indene results in the production of resins which are free from reactive residues, such as acid and/or halogen residues. Such neutral resins are particularly well adapted for many uses in the art as will be more particularly pointed out subsequently.

The activation of surface active agents by the application of heat is a particularly desirable procedure, as this treatment removes absorbed and/or adsorbed gas and liquids, such as water from the surface of the material, thus making a larger proportion of the surface available for catalytic activity of the type desired.

Due to their ready availability and low cost, the natural and/or activated clays or earths, including diatomaceous earths, are preferred for the polymerization of indene or indene fractions. Excellent results are obtained by the use of a natural clay, a heat-activated clay, or an acid-activated clay which has been substantially completely neutralized, such as by washing, either with an alkaline agent or solution, or water or both, followed by the removal of any water present, if desired, such as by heating. Other activating methods may, of course, be used, if desired. In general, it may be said that such procedures improve the polymerizing activity of the surface active agent by increasing the surface area exposed.

In this connection, also, it should be pointed out that a certain amount of activation may occur during the polymerization process, particularly when temperatures above the boiling point of water are employed. Thus, the addition of a natural clay of only moderate activity to an indene fraction, followed by the application of temperatures above 100° C. for at least a portion of the reaction, results in the removal of adsorbed water and/or gases from the surface of the clay and an increase in its polymerizing activity.

A satisfactory method is the use of a natural, substantially neutral clay for the polymerization of indene, such polymerization being carried out initially at temperatures below the boiling point of water, followed by the application of temperatures above the boiling point of water. By this procedure, the initial polymerization during which the concentration of indene is at a maximum may be carried out smoothly without undesired temperature surges due to the exothermic nature of the polymerizing reaction, while the polymerization is completed with a catalyst activated by the removal of adsorbed water and/or gases on the surface of the catalyst, thus insuring maximum yields.

While any desired quantity of surface active agent may be employed, I prefer to use from 1 to 30% and, more preferably, from 5 to 20%, based on the quantity of indene present in the reaction mixture. The catalyst may be added in more than one portion, and at any desired stage of the reaction.

The preferred process briefly comprises the addition of a surface active agent to an indene fraction or solution, maintaining the temperature of the reaction mixture below, say, 90° C. for at least a portion of the time, and completing the resin-forming reaction by raising the temperature of the reaction mixture above 100° C. The solution then is filtered to remove the catalyst, after which the resin solution may be used without further treatment, or the resin may be isolated, such as by distillation, which may be assisted by steam, and which may be carried out under reduced pressure, or otherwise.

As the resin-forming reaction is exothermic in nature, and the rate of polymerization is a function of the relative proportions of indene and surface active agent present, the temperature may be maintained at almost any desired level during the process by regulating the rate of addition of the surface active agent and/or the indene, or indene fraction or solution, to the reaction zone. The temperature also may be controlled within the desired limits by the application of external heating and/or cooling means. A combination of the foregoing methods also may be employed, if desired.

The process may be further illustrated by means of the following examples:

*Example 1*

A 121 gram portion of a light oil indene fraction, yellow in color, obtained by the pyrolysis of petroleum in the vapor state at temperatures above 1350° C. in the absence of catalysts, and containing 100 grams of indene was placed in a vessel equipped with an agitator, after which 79 grams of xylene and 10 grams of a natural clay which had been dried previously by heating for several hours at a temperature of 100° C. was added to the same vessel. The mixture was agitated, whereupon the temperature increased from 24° to 31° C. within a short period of time. The temperature remained at the latter level for a period of 20 minutes, after which the reaction mixture was heated to a temperature of 105° C. during a period of 45 minutes. The mixture was maintained at this temperature for an additional period of 2 hours, then filtered. Upon removing unpolymerized material by steam distillation under reduced pressure, a practically quantitative yield of resin having an A. S. T. M. ball-and-ring softening point of 122° C. and a Gardner color of 9 was obtained.

*Example 2*

A portion of the same fraction employed in Example 1 was refluxed for a period of 2 hours with 2% by weight of metallic sodium, after which the refined fraction was removed from the sodium and reaction products by distillation. The water-white distillate was polymerized according to the method employed in Example 1, whereupon there was obtained a resin having a Gardner color of 4.

In case mineral acids, alkyl or aryl sulfates, alkyl or aryl acid sulfates, or mixtures of sulfuric acid with organic liquids, such as ethers, esters, and/or alcohols, whether reacted or not, are employed as catalysts for the polymerization of indene or indene fractions, the process preferably is carried out by the application of not more than 10% by volume of such catalyst, or mixture of catalysts, at temperatures not exceeding 50° C. After the reaction has been completed, the acid and/or sludge may be permitted to stratify, after which it is drained and the resin solution neutralized. This may be accomplished by the use of aqueous alkaline solutions, or by the use of contact agents such as clay, or otherwise. The resin then may be isolated by any desired method, such as by distillation, which may be assisted by the use of steam and/or by the application of reduced pressures.

Resins prepared by the polymerization of indene, and more particularly light oil indene fractions, such as by the methods more particularly described herein are unusually well adapted for use in the preparation of coating compositions, such as varnishes, paints, lacquers, enamels, and the like.

Coating compositions prepared from resins of the type described herein have been found to be unusually well adapted for use for purposes requiring exceptional alkali resistance.

Such compositions may be prepared by dissolving the resin in a bodied or semi-bodied drying oil, followed by bodying the oil further after the addition of the resin if desired. Another method comprises bodying a mixture of the resin and the drying oil, or mixture of drying oils. In either case, the composition obtained may be thinned, if desired, by the use of a solvent, or mixture of solvents, such as mineral spirits, solvent naphtha, and the like.

My new varnishes may be employed both in single film and multiple film applications.

For instance, my new varnish may be used as a primer coat for another resinous coating compound of lesser bonding qualities, for example, the polymerized vinyl compounds, such as vinyl chloride-vinyl acetate copolymers. This applies particularly in the case of metal food containers. On the other hand, if desired, my varnish may be used as a top coat applied over some other primer coating.

In the preparation of my new varnishes, the resin may be incorporated, in any suitable manner, into any of the drying oils customarily employed in the varnish industry. Examples of such drying oils are China-wood oil, (tung oil), oiticica oil, dehydrated castor oil, linseed oil, isomerized linseed oil, perilla oil, rapeseed oil, fish oil, sardine oil, menhaden oil, processed fish oils, soya bean oil, cottonseed oil, and the like.

I have obtained varnishes exhibiting particularly desirable properties by the incorporation of the resin into China-wood oil, perilla oil, linseed oil, and isomerized linseed oil.

In most instances, it is desirable to incorporate a drier into the oil varnish mixture. Among the driers which may be employed for this purpose are the lead, cobalt and manganese salts of high molecular weight organic acids such as naphthenic acid, oleic acid, linoleic acid and the like.

The proportion of resin to drying oil employed in the preparation of varnishes in accordance with my invention may be widely varied so that a varnish of almost any desired length may be obtained.

As is well known in the varnish art, the length of a varnish is the number of gallons of drying oil used for each one hundred pounds of resin. I have prepared desirable varnishes having lengths of 5 to 100 gallons from resins of the type described herein. In other words, highly desirable varnishes may be prepared employing 5 to 100 gallons of drying oil for each 100 pounds of such resins.

A particularly desirable varnish is obtained when less than 30 gallons of drying oil are employed for each 100 pounds of such resins, in other words, a varnish having a length of less than 30 gallons.

Examples of drying oil varnishes prepared in accordance with my invention are as follows:

*Example 3*

A mixture of 119 parts of China-wood oil and 103.7 parts of a resin prepared as in Example 2 was heated to a temperature of 400° F. during a period of 20 minutes. The mixture then was heated to a temperature of 560° F. during a period of 10 minutes and held at this temperature for an additional period of 3 minutes. It was permitted to cool to 535° F. and held at this temperature until the desired body was obtained, as measured by the length of the string spun from a cooled drop of the varnish mixture. The mixture then was chilled to 400° F. and reduced by the addition of 293.3 parts of mineral spirits.

After reaching room temperature, 22.2 parts of a mixture of cobalt and manganese "oilsolates" (commercial driers which are salts of high molecular weight fatty acids) was added to the varnish.

*Example 4*

A mixture of 120 parts of processed oiticica oil and 100 parts of a resin prepared as in Example 2 was heated to a temperature of 560° F. during a period of 30 minutes, after which it was held at this temperature until the desired body had been attained, after which it was cooled to 400° F. and reduced by the addition of 293 parts of mineral spirits. Upon reaching room temperature, the required drier (23 parts of cobalt and manganese "Oilsolates") was added.

Example 5

A mixture of 120 parts of 4 hour bodied linseed oil and 100 parts of a resin prepared as in Example 2 was heated to a temperature of 585° F. during a period of 35 minutes. It was maintained at this temperature until the desired body had been attained, after which it was cooled to 400° F. and reduced by the addition of 290 parts of mineral spirits. The drier of Example 4 was stirred in upon reaching room temperature.

Example 6

Mix 125 pounds of a resin prepared as in Example 2 with 200 pounds of China-wood oil and heat from about 350° F. to 560° F. in about 30 minutes. Add 50 pounds of boiled linseed oil to chill the mix, removing the source of heat. After the temperature has fallen to about 400° F., thin with 475 pounds of mineral spirits. It may be desirable to add 5–10% of dipentene to the thinner to reduce skimming and wrinkling tendencies.

Example 7

Mix 125 pounds of a resin prepared as in Example 2 with 300 pounds of China-wood oil and heat from 350° to 560° F. in about 25 minutes. Remove the source of heat and chill the mixture with 175 pounds of bodied linseed oil. After cooling thin with mineral spirits to 25–30% solids.

Reference is made to my copending applications Serial No. 450,907, filed July 14, 1942, and Serial No. 588,668, filed April 16, 1945.

In the specification and in the claims, the term "a metal of groups IA and IIA of the periodic system" is intended to mean lithium, sodium, potassium, rubidium, caesium, barium, strontium, or calcium, as well as active alloys containing one or more of such metals as an essential ingredient.

The term "finely divided" when used in connection with such metals, or alloys thereof, is intended to define a material in the comminuted or dispersed state. For example, a material when reduced to such state of fineness that the preponderating part is composed of particles having an average diameter of less than 0.05", as well as materials in the colloidal or dissolved form, are to be considered finely divided.

While I have particularly described my invention, it is to be understood that this is by way of illustration, and that changes, omissions, additions, substitutions and/or modifications might be made within the scope of the claims without departing from the spirit of the invention.

I claim:

1. A process for purifying indene derived from light oil and containing remaining impurity which comprises commingling said indene with less than 5% by weight based on said indene of a finely divided material selected from the group consisting of metals and alloys of metals of groups IA and IIA of the periodic system, and separating indene in purified form from the resulting mass.

2. A process for purifying a light oil indene fraction contaminated with remaining impurity which comprises commingling with said fraction finely divided sodium in amount less than 5% by weight based on the indene present, and recovering indene from the resulting mass less contaminated with said impurity.

3. A process for purifying a light oil indene fraction contaminated with remaining impurity which comprises commingling with said fraction finely divided potassium in amount less than 5% by weight based on the indene present, and separating indene purified from impurity from the resulting mass.

4. A process for purifying a light oil indene fraction contaminated with remaining impurity which comprises commingling with said mixture finely divided calcium in amount less than 5% by weight based on the indene present, and separating indene purified from impurity from the resulting mass.

5. A process for purifying a light oil indene fraction boiling between 175° C. and 190° C. and containing remaining impurity which comprises contacting said fraction with a finely divided material selected from a group consisting of metals and alloys of metals of groups IA and IIA of the periodic system in amount less than 5% by weight based on the indene present, and recovering indene from the resulting mass less contaminated with said impurity.

6. A process for purifying a light oil indene fraction boiling between 175° C. and 190° C. and containing remaining impurity which comprises mixing said fraction with finely divided sodium in amount less than 5% by weight of the indene present, and separating purified indene from the resulting mass.

7. A process for purifying a light oil indene fraction contaminated with impurity remaining from said light oil, which comprises commingling said contaminated indene with less than 5% by weight of said indene of a finely divided material selected from the group consisting of metals and alloys of metals of groups IA and IIA of the periodic system at a temperature in the range of from 30° C. to 200° C. to react said impurity without reacting the preponderant portion of said indene, and recovering indene in purified form from the resulting mass.

FRANK J. SODAY.